United States Patent
Norfolk

[15] 3,685,373
[45] Aug. 22, 1972

[54] MANUFACTURE OF SAW BLADES

[72] Inventor: Cyril Leslie Norfolk, Enox House, Faraday Rd., Crawley, England

[22] Filed: Nov. 2, 1970

[21] Appl. No.: 86,064

[30] Foreign Application Priority Data

Nov. 12, 1969   Great Britain..........55,433/69

[52] U.S. Cl. .....................................76/112, 219/75
[51] Int. Cl. ............................................B23d 63/00
[58] Field of Search ........76/101, 112; 219/121 P, 77

[56] References Cited

UNITED STATES PATENTS

| | | | |
|---|---|---|---|
| 3,089,945 | 5/1963 | Connoy et al. | 76/112 X |
| 3,370,148 | 2/1968 | Ardenne | 219/75 |
| 2,905,805 | 9/1959 | McElrath et al. | 219/75 X |
| 3,315,548 | 4/1967 | Anderson et al. | 76/112 |

*Primary Examiner*—Bernard Stickney
*Attorney*—Darby & Darby

[57] ABSTRACT

Bimetallic blades, particularly saw blades, are made by edge welding together, by microplasma welding, two strips of steel, and converting the welded composite strip to blade form.

9 Claims, 1 Drawing Figure

PATENTED AUG 22 1972 3,685,373
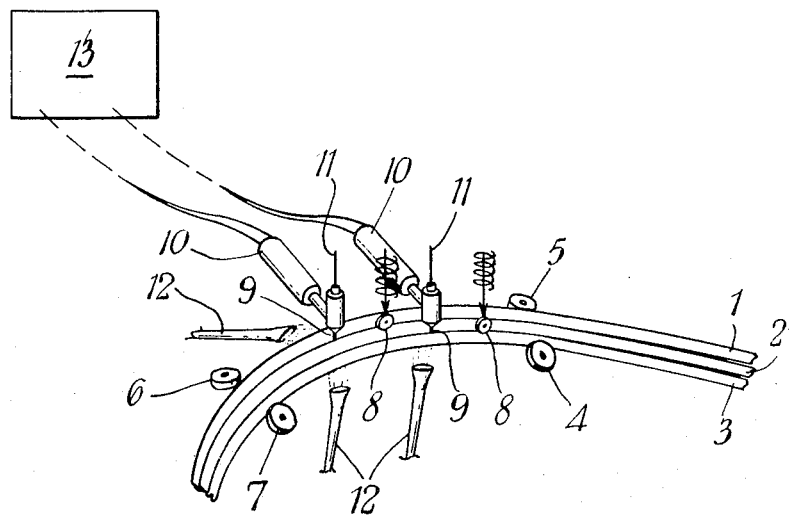
INVENTOR
CYRIL LESLIE NORFOLK

MANUFACTURE OF SAW BLADES

This invention relates to the manufacture of steel blades, particularly saw blades such as hacksaw blades.

In saw blades, the most desirable mechanical and metallurgical properties for a. the cutting edge portion, e.g. the teeth of a saw blade and
b. The remainder of the blade, are often different. Thus, the steel for the teeth of a saw should have high hardness and cutting power while that for the remainder of the blade requires strength and resilience. Similar considerations apply in the case of other blades.

It has previously been proposed to produce saw blades using two strips of steel edge welded together to give a composite blade having a tooth portion of one type of steel and the remainder of another. The principal difficulty which arises in the manufacture of such blades is that of securing adequate bonding between the two types of steel without distortion.

One technique which has been employed is to weld the two strips of steel by electron beam welding. This method, however, is expensive and cumbersome to adopt, and is difficult to control. Furthermore, the results in terms of weld strength are generally unsatisfactory. In addition, it is necessary to degrease and grind the surfaces which are to be joined.

We have now found that surprisingly improved results may be achieved by the use of microplasma welding techniques. According therefore to a first feature of the present invention, there is provided a method of manufacturing a blade which comprises the steps of welding together edge-to-edge two strips of steel, one of which is to constitute a cutting edge portion of the finished blade and the other of which is to constitute the remainder of the blade, the welding method used being that of microplasma welding, and converting the welded strip so obtained to blades.

Generally, in microplasma welding an arc is struck between a central tungsten cathode rod and a surrounding hollow cone shaped copper anode which ends with a circular section of small diameter (e.g. 0.72 mm) near the apex of the cone. Argon is blown into the copper anode and emerges through the arc at the end of the cone as a directed gaseous plasma stream, at extremely high temperature which is directed onto the material to be welded. In order to enhance weld quality it is customary to surround the plasma stream with a stream of shielding gases, usually a mixture of argon containing a few percent of hydrogen.

In the present case, the beam of plasma is directed at the seam line between the two strips of dissimilar steels to be joined, and, again with the object of improving weld quality, it is advantageous to provide, directed on the side of the strip remote from the plasma source, a further stream of shielding gas such as argon.

The microplasma welding apparatus used may be selected from available types. It is found preferable to control the width of the weld obtained by means of adjustment of the arc current and of the anode/weld distance, and to adjust the penetration of the stream of plasma into the arc by means of adjustment of the rate of gas flow through the arc.

We have surprisingly found that it is preferable to use in the shielding gas stream surrounding the plasma stream, an argon-containing gas mixture containing substantially more hydrogen than that used heretofore. By increasing the hydrogen content, e.g. to 15 percent by volume, it is found that welding speed may be increased satisfactorily without a decrease in weld quality. This is of great economic advantage. In one series of tests, we found that the maximum recommended welding speed of 35 cm/min could be increased, by the use of a shielding gas mixture of 85 percent argon and 15 percent hydrogen, to a figure of over 48 cm/min without any decrease in weld quality.

After the microplasma welding of the strips of different steels together, the steels are generally merely allowed to cool in air, and this leads to a very brittle and hard welded strip. In order to render the strip workable to enable it to be turned into blades, it is preferable to subject the welded strip, next after the welding step, to an annealing. This may be carried out by heating the strip, in a closed container, to a temperature of 750° – 1,050° C. for about an hour and then letting the strip slowly cool to room temperature. A heating temperature of about 800° C. is most preferred.

After the annealing step, the welded strip may be treated to give a blade of the desired type, e.g. a saw blade, by conventional treatment methods. Generally, the sequence of operations is first to cold roll the strip to press down any protruding weld metal or the like and to straighten the strip by any convenient straightening device. Thereafter the strip may be punched into blade lengths, provided with punched fixing holes if desired and then the cutting edge is shaped. For knife blades a grinding step may be carried out, while for saw blades, it is customary to assemble the blade blanks into a vice and mill the assembly to give each blade its teeth. Naturally, in such a case, care must be taken to mill the teeth on the correct portion of the saw blade blank. It is then customary to set the teeth. After the cutting edge has been shaped, the blade blank is subjected to a heat treatment to give the cutting portion of the blade the necessary hardness.

It was found that, in the manufacture of bimetallic blades i.e. blades composed of more than one type of steel, problems can arise during such a heat-treatment due to the differing optimum heat-treatment times and temperatures for the different steels, and due to the different properties of the steels, for example differing thermal expansion coefficients.

A particularly preferred heat treatment method for such bimetallic blades, which method constitutes a further feature of this invention, is to subject the blades to a high-temperature heat-treatment suitable for the steel of the cutting edge portion, cool the blade relatively slowly to a temperature below 800° C., and thereafter to temper the blade at a temperature in the range of 500° – 650° C. for a sufficient time to reduce the grain size of the steel in the remainder of the blade to give a backing of the desired strength. Preferably tempering is carried out in a recirculating furnace at about 550° C. for 2½ to 3 hours. The initial high-temperature heat treatment step is preferably carried out at a temperature of 1,240° – 1,280° C. for 45 – 60 seconds, followed by a lowering of the temperature to 800° C. over a period of about 1 minute. Thereafter, the blades can be allowed to cool to room temperature before tempering if desired.

For reasons of convenience and economy it is particularly advantageous to manufacture blades according to the method defined above by microplasma welding together three strips of steel and then cutting the central strip longitudinally down its center to give two strips of duplex material. Thus, there may be welded together two outer 9 mm. wide strips of steel suitable for the non-toothed portion of a hacksaw blade and a central 6 mm. wide strip of high speed steel suitable for the teeth of the blade.

The accompanying drawing shows, by way of example, a suitable arrangement for welding the steel strips together. The apparatus comprises guide means for steel strips which lead them round a curved path from supply reels of strip (on the right of the drawing) to a take up reel (on the left).

In the drawings, strips 1, 2 and 3 are led together over a curved path as shown, the strips are held laterally together by means of rollers 4, 5, 6 and 7. Each pair of strips are pressed firmly down onto the bed of the machine (not shown) by means of spring loaded idler rollers 8, located just before the welding position 9. Welding is effected by two microplasma arc guns 10, from the top of each of which can be seen the protruding tungsten arc striker rod 11. Argon, used as a purge gas, is blown during welding both from the guns 10 down onto the strips and from additional jets 12. A shield gas mixture of 85 percent argon and 15 percent hydrogen is blown downwards surrounding the argon plasma stream. The plasma arc welding guns 10 are powered and controlled in known fashion by control box 13.

In a particular example, the strip steel used was as follows:

backing steel: a medium carbon steel to standard specification EN 19 Thickness 0.6 mm width 9 mm.

tooth strip steel: a type 652 high speed steel thickness 0.6 mm width 6 mm.

A strip of backing steel was welded by microplasma welding to each side of the tooth strip steel, using apparatus as described above, and using conventional microplasma welding apparatus. In use, the shielding gas flow (argon/hydrogen mixture) was 215 liters per hour, and the welding rate 49 cm/minute. Arc current was 12 – 15 amps and plasma argon flow of 140 – 280 liters per hour. The anode was 2.25 mm from the weld.

The coiled triplex strip was then annealed by heating for one hour at 800° C. and then slow cooling, at about 100° C. per hour, to room temperature. The strip was then slit, cold rolled, straightened and stamped to blade blanks. The blanks were then arranged in groups and teeth milled in the high-speed steel. The blades were then passed through a setting machine to set the teeth and then arranged on racks to be put into a heat-treatment furnace.

The blades were heated rapidly to 1,260° C. and held there for 50 seconds, while being kept in a reducing atmosphere to prevent oxidation of the blades, and then held for a minute in a gas stream at 800° C. Thereafter the blades were allowed to cool to room temperature and then placed in a recirculating furnace at 550° C. for three hours.

After this tempering, the blades were painted and ready for use.

In use, hack-saw blades produced as just described were supplied together with hack-saw blades produced by a similar method but using electron beam welding, to craft apprentices in an engineering workshop, and the blades were used as occasion demanded on a range of low carbon and medium carbon steels, varying in section size from 3 mm thick sheet to 30 × 18 mm rectangular section bar, and also on structural angle steel of sizes 18 mm by 18 × 4.5 mm to 60 × 60 × 6 mm. Using the blades produced with electron beam welding, it was found that, after a period of two to three hours of reasonably consistent hacksawing, the tooth portion chipped or separated from the mild steel backing strip. At this stage the blades were examined and it was found to be that the weld area was of a very brittle nature and after previous cracking or breaking on the shop floor, the rest of the high speed steel tooth strip could be removed by hand pressure.

However, in the use of the blades made using microplasma welding, it was found that these blades retained their cutting edge for a far greater length of time and all in all, were used on the shop floor by the apprentices for a period of 10 days with no apparent deterioration in the efficiency of the blade. There were no visual deficiencies in that time around the weld areas.

It is clear from this test that the blades produced using electron beam welding were not of practical application and quality, while the mere change of the welding method gave blades of high quality, high wear resistance and long life.

It is to be observed that the method of the invention may be used in the manufacture of a wide variety of saw blades, for example hack-saw blades, padsaw blades, jigsaw blades, bandsaw blades, bowsaw blades and coping saw blades. It may also be used advantageously in the manufacture of circular hole cutting saws, and in the manufacture of a wide variety of other industrial cutting blades. I claim as my invention:

1. A method of manufacturing a blade utilizing microplasma welding to weld together in edge-to-edge relation a prefabricated strip of cutting tool steel and a prefabricated strip of backing steel, comprising the steps of (a) directing a plasma stream at the strips in a direction contained in the plane of the edge surfaces of the strips to be welded, and (b) shielding the plasma stream by means of a gaseous stream of a mixture of hydrogen and argon, and (c) converting the strip of cutting tool steel into a blade.

2. A method according to claim 1 wherein a stream of shielding gas is blown at the strips from the side thereof opposite to the side receiving the plasma stream to prevent oxidation at said opposite side.

3. A method according to claim 1 wherein the gaseous stream consists substantially of 15 percent by volume hydrogen and 85% by volume argon.

4. A method according to claim 1 wherein the welded strip is annealed as a step immediately after the microplasma welding step.

5. A method according to claim 1 wherein, after the microplasma welding step, the cutting edge of the blade is shaped and thereafter the whole blade is subjected to a high-temperature heat-treatment suitable for the steel of the cutting edge portion, cooled relatively slowly to a temperature below 800° C. and then tempered at a temperature of 500°–650° C. for a time sufficient to give the remainder of the blade the desired strength and resilience.

6. A method according to claim 5 wherein the tempering is carried out for 2½ to 3 hours.

7. A method according to claim 5 wherein the high temperature heat treatment is carried out at 1,240°–1,280° C. for 45–60 seconds.

8. A method according to claim 1 which includes the steps of welding a strip of steel which is to form a remainder of blade portion, by microplasma arc welding, to each side of a strip of high-speed steel suitable for forming a cutting portion of a blade, and then slitting the strip of high-speed steel centrally.

9. A method according to claim 1 wherein teeth are formed on a cutting portion to form a saw blade.

* * * * *

UNITED STATES PATENT OFFICE
CERTIFICATE OF CORRECTION

Patent No. __3,685,373__    Dated __August 22, 1972__

Inventor(s) __Cyril Leslie Norfolk__

It is certified that error appears in the above-identified patent and that said Letters Patent are hereby corrected as shown below:

On the cover sheet, insert -- [73] Assignee: Fry's (London) Limited, Faraday, England -- .

Signed and sealed this 8th day of May 1973.

(SEAL)
Attest:

EDWARD M. FLETCHER, JR.                ROBERT GOTTSCHALK
Attesting Officer                      Commissioner of Patents